United States Patent
Meynen (10) Patent No.: US 8,919,954 B2
(45) Date of Patent: Dec. 30, 2014

(54) METHOD FOR OBTAINING AN OPHTHALMIC LENS

(71) Applicant: Essilor International (Compagnie Generale D'Optique), Charenton-le-pont (FR)

(72) Inventor: Mathieu Meynen, Charenton-le-Pont (FR)

(73) Assignee: Essilor International (Compagnie Generale d'Optique), Charenton-le-Pont (FR)

( * ) Notice: Subject to any disclaimer, the term of this patent is extended or adjusted under 35 U.S.C. 154(b) by 0 days.

(21) Appl. No.: 14/352,447

(22) PCT Filed: Nov. 14, 2012

(86) PCT No.: PCT/FR2012/052620
§ 371 (c)(1),
(2), (4) Date: Apr. 17, 2014

(87) PCT Pub. No.: WO2013/076403
PCT Pub. Date: May 30, 2013

(65) Prior Publication Data
US 2014/0240663 A1    Aug. 28, 2014

(30) Foreign Application Priority Data
Nov. 22, 2011    (FR) ........................... 11 60664

(51) Int. Cl.
*G02C 3/00* (2006.01)
*G02C 7/00* (2006.01)
*B24B 13/06* (2006.01)
*B23B 5/36* (2006.01)
*B29D 11/00* (2006.01)

(52) U.S. Cl.
CPC . *G02C 7/00* (2013.01); *B24B 13/06* (2013.01); *B23B 5/36* (2013.01); *B29D 11/00932* (2013.01)

USPC ......................................... 351/159.73; 264/1.1

(58) Field of Classification Search
USPC ................ 351/159.73–159.75; 264/1.1, 1.32; 65/36
See application file for complete search history.

(56) References Cited

U.S. PATENT DOCUMENTS

| 5,938,381 A | 8/1999 | Diehl et al. |
| 6,558,586 B1 * | 5/2003 | Padiou et al. .................. 264/1.7 |
| 2009/0022554 A1 | 1/2009 | Gourraud |

FOREIGN PATENT DOCUMENTS

| WO | 01/66308 A1 | 9/2001 |
| WO | 2006/097607 A1 | 9/2006 |

OTHER PUBLICATIONS

International Search Report, dated Mar. 1, 2013, from corresponding PCT application.

*Primary Examiner* — James Greece
(74) *Attorney, Agent, or Firm* — Young & Thompson (57) ABSTRACT

A method for obtaining an ophthalmic lens, includes: —the step of selecting a material that displays a threshold of pinhole formation during a machining step of a finished surface (20) in a material-removing depth (D) of 0.07 mm, which is at least 15% higher than the threshold of pinhole formation during a machining step of a finished surface in a material-removing depth (D) of 0.22 mm; —the step of selecting a set point for finishing depth of cut (A) between 0.015 mm and 0.075 mm; and—the step of selecting a set point for finishing feed between 85% and 99% of the threshold of pinhole formation for the material-removing depth (D) given by the sum of the selected set point for finishing depth of cut (A) and the blank roughness (B').

12 Claims, 4 Drawing Sheets

METHOD FOR OBTAINING AN OPHTHALMIC LENS

FIELD OF THE INVENTION

The invention relates to obtaining an ophthalmic lens from a blank made of a material able to be surfaced by machining.

PRIOR ART

It is known that to obtain, from such a blank, an ophthalmic lens having sought optical properties, for example in order to correct the vision of a wearer with myopic, astigmatic or presbyopic vision, a step of surfacing a face of the blank by machining is implemented.

This surfacing step comprises, in succession, a step of machining a roughing surface and a step of machining a finishing surface.

The step of machining a roughing surface is carried out with a machine comprising a roughing tool, for example such as described in the U.S. Pat. No. 5,938,381, forming a roughing surface comprising a roughing trough having a circularly arcuate profile the radius of curvature of which is fixed by the shape of the roughing tool, and having a pitch defined by a roughing advance setpoint given to the machine.

The step of machining a finishing surface is carried out with a machine comprising a finishing tool, for example such as described in international patent application WO 2006/097607, which corresponds to the United States patent application US 2009/0022554, this finishing tool forming a finishing surface by digging the roughing surface, over a depth defined by a finishing pass depth setpoint given to the machine, thereby forming a finishing trough having a pitch defined by a finishing advance setpoint given to the machine.

The step of surfacing by machining is followed by a step of polishing that gives the surface its optical appearance without modifying its shape.

SUBJECT OF THE INVENTION

The invention aims to improve the step of surfacing by machining a face of a blank intended to become an ophthalmic lens.

For this purpose, it provides a process for obtaining an ophthalmic lens, comprising:

a step of providing a blank made of a material able to be surfaced by machining; and a step of surfacing the face of said blank by machining, comprising, in succession, a step of machining a roughing surface, and a step of machining a finishing surface, said step of machining a roughing surface being carried out with a machine comprising a roughing tool forming a roughing surface comprising a roughing trough having a circularly arcuate profile the radius of curvature of which is fixed by the shape of the roughing tool and having a pitch defined by a roughing advance setpoint given to said machine; said step of machining a finishing surface being carried out with a machine comprising a finishing tool that forms a finishing surface by digging said roughing surface to a depth defined by a finishing pass depth setpoint given to said machine, thereby forming a finishing trough having a pitch defined by a finishing advance setpoint given to said machine;

characterized in that:

said step of providing a blank comprises the step of selecting, for said blank, a said material that has a pitting appearance threshold during a said step of machining a finishing surface over a material removal depth of 0.07 mm that is at least 15% higher than the pitting appearance threshold during a said step of machining a finishing surface over a material removal depth of 0.22 mm, each said pitting appearance threshold being the finishing advance setpoint from which pitting appears for a preset material removal depth, each said material removal depth being the sum of the finishing pass depth setpoint employed and the roughing roughness B' given by the relationship:

$$B' = \frac{C'^2}{8R'}$$

where:
C' is the roughing advance or the pitch of the roughing trough; and
R' is the radius of curvature of the roughing tool or the roughing trough;

said step of machining a finishing surface comprises the step of selecting said finishing pass depth setpoint between 0.015 mm and 0.075 mm; and said step of machining a finishing surface comprises the step of selecting said finishing advance setpoint between 85 and 99% of the pitting appearance threshold for the material removal depth given by the sum of the selected finishing pass depth setpoint and the roughing roughness B'.

The invention is based on the discovery that, for certain materials, when material removal depth is decreased the pitting appearance threshold increases; and that, in particular for certain materials, the increase is at least 15% when the material removal depth is changed from 0.22 mm to 0.07 mm.

The invention is also based on the observation that the main defects that must be removed, during the operation for machining a finishing surface, are cracks that are created, during the operation for machining a roughing surface, under the roughing surface, and that, with current roughing machining machines and tools, a finishing pass depth between 0.015 mm and 0.075 mm, which is much smaller than pass depths conventionally used, remains smaller than the crack depth.

Thus, by choosing a particularly small pass depth that is also as close as possible to the pitting appearance threshold, the step of machining a finishing surface may be implemented in a much smaller amount of time since it is at least 15% shorter than conventional steps for machining a finishing surface.

According to preferred features:

said step of providing a blank comprises the step of selecting, for said blank, a polythiourethane;

said polythiourethane is MR7;

said step of machining a finishing surface is carried out with a finishing tool configured to form a finishing trough having a radius of curvature comprised between 1.9 and 2.1 mm; said finishing pass depth setpoint is comprised between 0.03 and 0.06 mm; whereas said finishing advance setpoint is comprised between 0.076 and 0.102 mm/revolution;

said step of machining a finishing surface is carried out with a finishing tool configured to form a finishing trough having a radius of curvature comprised between 4.9 and 5.1 mm; said finishing pass depth setpoint is comprised between 0.03 and 0.06 mm; whereas said finishing advance setpoint is comprised between 0.121 and 0.160 mm/revolution;

said polythiourethane is MR8;

said step of machining a finishing surface is carried out with a finishing tool configured to form a finishing trough having a radius of curvature comprised between 1.9 and 2.1 mm; said finishing pass depth setpoint is comprised between 0.03 and 0.06 mm; whereas said finishing advance setpoint is comprised between 0.055 and 0.074 mm/revolution; and/or said step of machining a finishing surface is carried out with a finishing tool configured to form a finishing trough having a radius of curvature comprised between 4.9 and 5.1 mm; said finishing pass depth setpoint is comprised between 0.03 and 0.06 mm; whereas said finishing advance setpoint is comprised between 0.088 and 0.117 mm/revolution.

According to other preferred features, said step of machining a roughing surface and said step of machining a finishing surface are carried out with one and the same machine, and said step of machining a roughing surface comprises the step of selecting, for said roughing advance setpoint, a value minimizing a total time T taken, by said machine, to implement the step of machining a roughing surface and the step of machining a finishing surface.

Implementing these features makes it possible to make the surfacing step of the process according to the invention particularly rapid.

According to preferred features, said step of selecting, for said roughing advance setpoint, a value minimizing a total time T, comprises:

the step of modeling the total time T by the relationship:

$$T = K1 + \frac{K2}{C'} + \frac{K3}{C}$$

where:
K1 is a constant grouping together the time spent by the machine on operations other than the step of machining a finishing surface and the step of machining a finishing surface;
K2 is a constant related to the step of machining a roughing surface;
K3 is a constant related to the step of machining a finishing surface; and
C is the roughing advance or the pitch of the finishing trough;

the step of calculating, for each of n roughing advance setpoint values, the respective total machining time T, with, for each ith roughing advance setpoint, for i taken from among 1 to n, the ith finishing advance setpoint calculated by implementing said step of selecting the finishing advance setpoint, taking into account the material removal depth given by the sum of the selected finishing pass depth setpoint and the roughing roughness B', corresponding to the ith roughing advance setpoint; and the step of selecting, as roughing advance setpoint, the mth roughing advance setpoint, and, as finishing advance setpoint, the mth finishing advance setpoint, where m is the i for which the total time T is the shortest.

According to preferred features, said step of machining a roughing surface is carried out with a roughing tool configured to form a roughing trough having a radius of curvature comprised between 33 and 34 mm; whereas said roughing advance setpoint is comprised between 1.16 and 5.18 mm/revolution.

According to other preferred features, which are simple and easy to implement, said roughing trough and said finishing trough are spirals.

BRIEF DESCRIPTION OF THE DRAWINGS

The demonstration of the invention will now continue with a detailed description of embodiments thereof, given by way of illustration and nonlimiting example, and with reference to the appended drawings. In these figures.

DETAILED DESCRIPTION OF EMBODIMENTS

Figure 1:
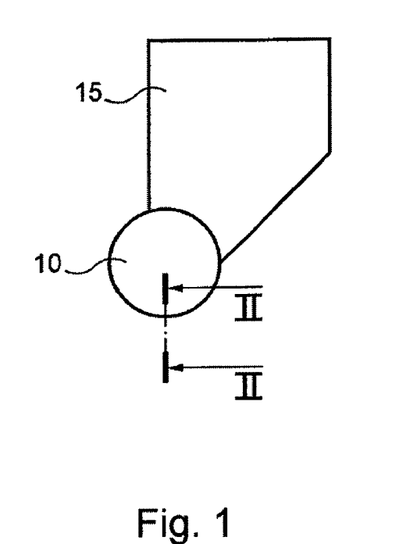
FIG. 1 is a front view of a machine for machining a face of a blank made of an organic material, which blank is provided to become an ophthalmic lens after machining, this machine comprising a finishing tool and a tool holder.

The finishing tool 10 illustrated in FIG. 1 and the machining machine of which it forms part are here such as described in international patent application WO 2006/097607, corresponding to United States patent application US 2009/0022554.

The finishing tool 10 is generally circular in shape. It has an attack face 11, a rake face 12 and a back face 13. The junction between the attack face 11 and the rake face 12 forms a cutting edge 14.

The tool 10 is fixed to a tool holder 15 so that the cutting edge 14 is available over at least one portion of the circumference of the tool 10 for machining a blank 16 (FIGS. 2 and 3), which blank is provided to become, after machining of its face 17, an ophthalmic lens.

The machine of which the finishing tool 10 forms part is configured to drive the blank 16 to rotate, and to drive the tool 10 to slide both in a direction parallel to the axis about which the blank 16 is driven to rotate, and in a direction transverse to this axis of rotation.

The members for driving the tool to slide in these two directions are synchronized with the member for driving the blank to rotate in order to allow a complex surface—especially one of the faces of a spectacle glass for a wearer with myopic, astigmatic or presbyopic vision—to be machined.

Figure 2:
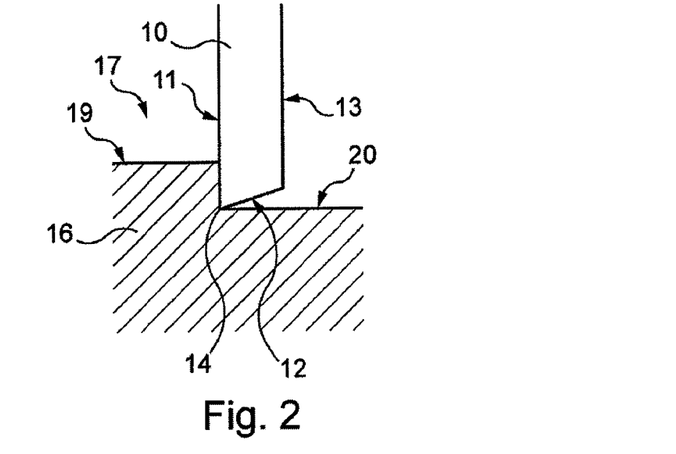
FIG. 2 is a view showing the finishing tool in cross section along the line II-II in FIG. 1, during the machining of a face of the blank.

FIG. 2 shows the tool 10 in the process of machining the face 17 of the blank 16: the tool 10 penetrates into the material of the blank 16 over a depth defined by a pass depth setpoint given to the machine, the face 16 being machined with the attack face 11 of the tool 10, which produces shavings as it advances in the material.

More precisely, the tool 10 digs a spiral trough 18 (FIGS. 3 and 4) having a pitch defined by an advance setpoint given to the machine.

Figure 3:
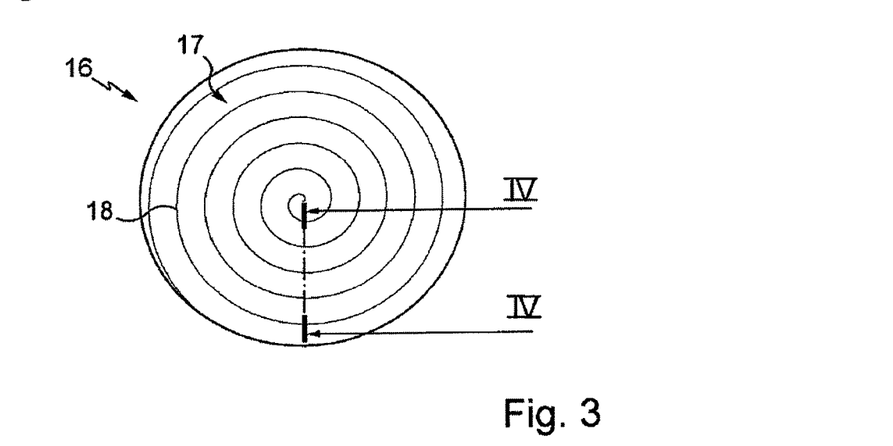
FIG. 3 is a very schematic view showing the trough dug by the finishing tool in this face of the blank.

In FIG. 3, the trough 18 is represented, very schematically, by its bottom lines.

It will be noted that, to simplify the drawings, the trough 18 shown in FIG. 3 has a much smaller number of revolutions than the trough formed in practice by the finishing tool 10.

Figure 4:
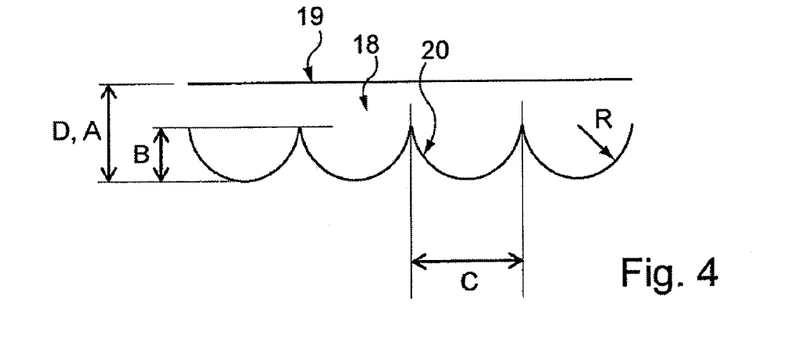
FIG. 4 is a view seen as marked by IV-IV in FIG. 3, the bottom line schematically illustrating the surface after machining, the top line illustrating the initial surface of this face of the blank, it being assumed that this initial surface is uniform.

FIGS. 2 and 4 show the initial surface 19 of the face 17 of the blank 16 and the surface 20 after machining by the finishing tool 10.

It will be noticed that, in practice, the step of surfacing the face 17 comprises, in succession, a step of machining a roughing surface with a roughing tool and a step of machining a finishing surface with the finishing tool, but that here, to simplify the description, it is initially assumed that the face 17 of the blank 16 has been machined with the finishing tool 10 from an initially uniform surface 19.

Because of the generally circular shape of the finishing tool 10, the trough 18 has a circularly arcuate profile the radius of curvature R of which is fixed by the shape of the tool 10. Here, the tool 10 being of generally circular shape, the radius of curvature R of the trough 18 is the radius of the tool 10.

FIG. 4 shows, in addition to the lines illustrating the surfaces 19 and 20, the pass depth A, the roughness B and the pitch C of the trough 18.

As indicated above, the pitch C is defined by an advance setpoint given to the machine (the advance setpoint is C/revolution) for the tool 10, i.e. the finishing advance setpoint.

Here, the roughness B is the difference between the bottoms and tops of the trough 18. It may be demonstrated that the following relationship exists between the pitch C, the radius of curvature R and the roughness B:

$$C = 2\sqrt{R^2 - (R-B)^2}$$

If the term $B^2$ is neglected, the following relationship is obtained:

$$B = \frac{C^2}{8R}$$

As indicated above, the tool 10 penetrates into the material of the blank 16 over a depth defined by a pass depth setpoint given to the machining machine.

Because of the circular shape of the tool 10, the depth dug under the initial surface 19 is not constant.

For the reasons given above, it is necessary to distinguish between:

the pass depth A, which is the difference between the reference starting surface, known by the machine, and the target surface that it is proposed to machine; and the material removal depth D, which is the maximum difference between the actual starting surface and the actual surface after machining.

Here, as the initial surface 19 is assumed to be uniform, the reference starting surface and the actual starting surface are coincident; and the target surface that it is proposed to machine is the surface that passes through the bottom lines of the trough 18; therefore, the pass depth A is equal to the material removal depth D.

Figure 5:
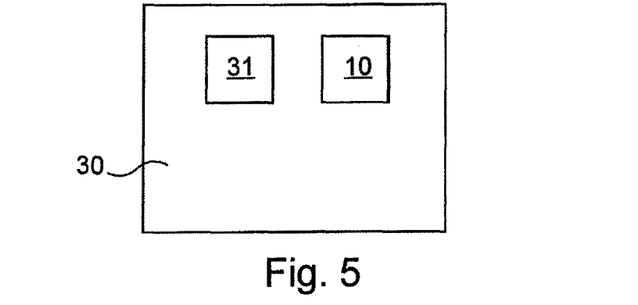
FIG. 5 is a very schematic view of a machining machine configured to carry out, on a face of a blank, a surfacing step comprising, in succession, a step of machining a roughing surface and a step of machining a finishing surface.

The machine 30 illustrated, very schematically, in FIG. 5 is configured to perform, in its entirety, the step of surfacing the face 17 of the blank 16 by machining, by carrying out, in succession, a step of machining a roughing surface with a roughing tool 31 and a step of machining a finishing surface with the finishing tool 10.

The machine 30 uses one and the same member for driving the blank 16 to rotate to perform the step of machining a roughing surface and the step of machining a finishing surface, the blank 16 remaining in place on this member between a loading step, carried out before the step of machining a roughing surface, and an unloading step, carried out after the step of machining a finishing surface.

The machine 30 comprises, for the roughing tool 31, driving members that are separate from the driving members of the finishing tool 10. The kinematics used in the step of machining a roughing surface are similar to the kinematics used in the step of machining a finishing surface. Furthermore, here the roughing tool 31 turns about itself. The roughing tool 31 is, for example, a rotary mill such as described in U.S. Pat. No. 5,938,381.

Thus, the roughing tool forms a roughing surface 32 (FIG. 6) comprising a spiral roughing trough 33 having a circularly arcuate profile the radius of curvature of which is fixed by the shape of the roughing tool, and having a pitch defined by a roughing advance setpoint given to the machine 30.

Figure 6:
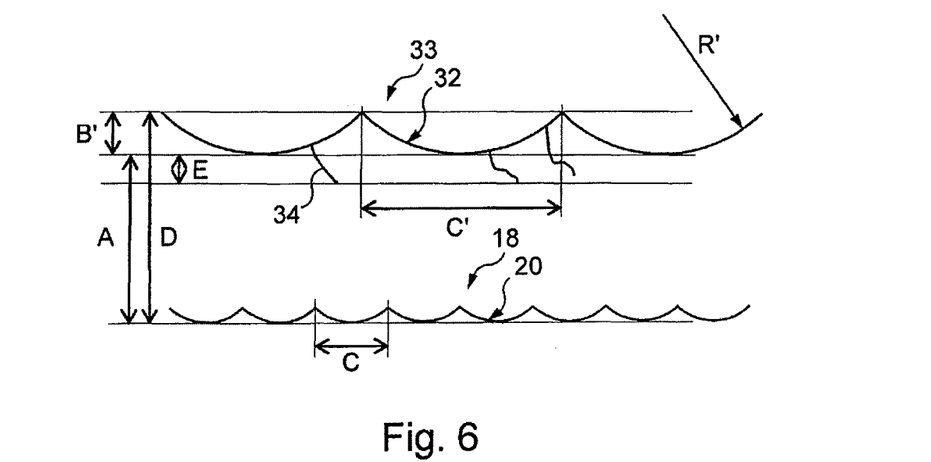
FIG. 6 is a similar view to that in FIG. 4 but with the top line representing a roughing surface formed by a roughing tool.

FIG. 6 shows, in addition to lines illustrating the roughing surface 32 and the finishing surface 20, the finishing pass depth A, the material removal depth D, the roughness B', the pitch C' and the radius of curvature R' of the roughing trough 33.

The radius of curvature R' and the pitch C' (and therefore the roughing advance setpoint) are much larger than the radius of curvature R and the pitch C of the finishing trough 18.

The roughness B' of the roughing trough 33 is given by the relationship:

$$B' = \frac{C'^2}{8R'}$$

The finishing pass depth A, which is equal to the finishing pass depth setpoint given to the machine 30, is the difference between the target surface of the step of machining a roughing surface (which becomes the reference starting surface, known by the machine, for the step of machining a finishing surface) and the target surface of the step of machining a finishing surface.

In practice, this is the difference between the surface that passes through the bottom lines of the roughing trough 33 and the surface that passes through the bottom lines of the finishing trough 18.

The material removal depth D is the maximum difference able to exist between the roughing trough 33 and the finishing trough 18. In practice, this is the difference between the bottoms of the trough 18 and the peaks of the trough 33.

As may be seen in FIG. 6, the material removal depth D is the sum of the pass depth A and the roughing roughness B'.

It is known that the main type of defect liable to appear on the surface 20 machined by the finishing tool 10, i.e. the finishing surface, is splintering or chipping, generally called pitting.

Pitting appears when the material removal depth becomes too large.

It will be noted that the studies on which the present invention is based established that it is not enough to only take into account the pass depth A but that it is also necessary to include the roughing roughness B' in order to take actual physical effects, relating the material removal depth D, into account.

Figure 7:
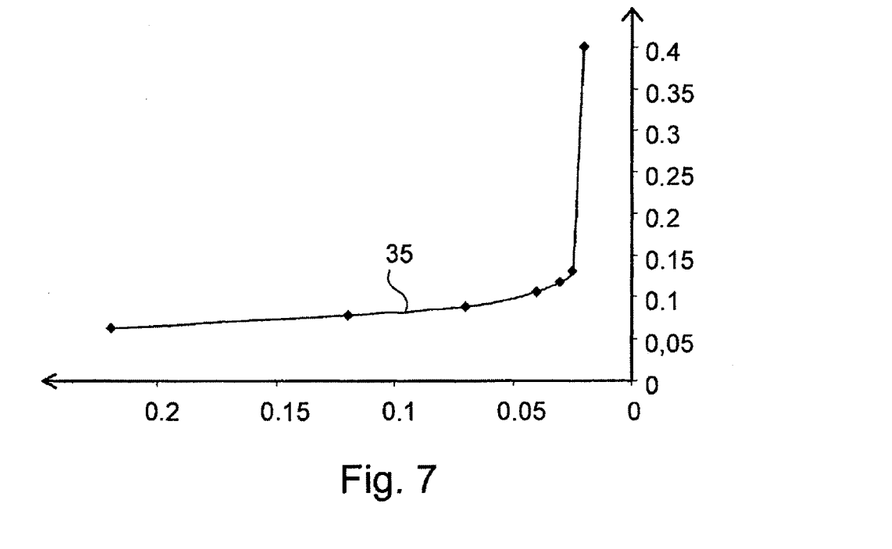
FIG. 7 is a graph in which the x-axis represents the material removal depth during a surfacing step with the finishing tool, whereas the y-axis represents the finishing advance setpoint, this graph showing the curve of the pitting appearance threshold for the material MR7.

The curve 35 in FIG. 7 shows the pitting appearance threshold for the material MR7. The x-axis represents the material removal depth D, expressed in mm. The y-axis represents the finishing advance setpoint, expressed in mm/revolution.

This curve was established under preset experimental conditions: here, the target roughing surface (which passes through the bottom lines of the trough 33) is a plane and the target finishing surface (which passes through the bottom lines of the trough 18) is a plane parallel to the target roughing surface; the roughness B' of the roughing surface 32 is fixed to 0.02 mm, the radius of curvature R of the finishing tool 10, and therefore of the trough of the finishing surface 20, is 2 mm, with a cutting angle (inclination of the attack face 11 to the normal to the surface to be machined) of zero, as shown in FIG. 2. Various trials have been carried out on the same machine with the same roughing tool 31 and the same finishing tool 10.

It was observed, and this is the discovery on which the present invention is based, that as material removal depth decreases, the pitting appearance threshold very substantially increases.

Figure 8:
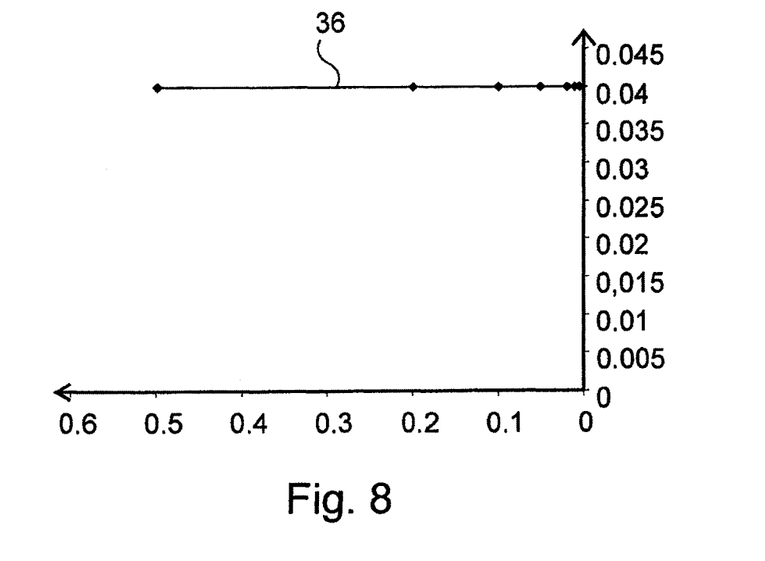
FIG. 8 is a similar graph to the graph in FIG. 7, but for the material CR39, with different scales on the x- and y-axes.

For the sake of comparison, the curve 36 illustrated in FIG. 8 was established, in the same way as the curve 35, for the material CR39. It will be observed that the pitting appearance threshold does not vary with material removal depth, the threshold remaining at 0.04 mm/revolution between a material removal depth of 0.5 mm and a material removal depth very close to 0.

In practice, in ophthalmic lens manufacturing laboratories, a finishing advance setpoint of 0.033 mm/revolution is used for the material CR39 whatever the finishing pass depth setpoint, which is in general 0.2 mm.

Figure 9:
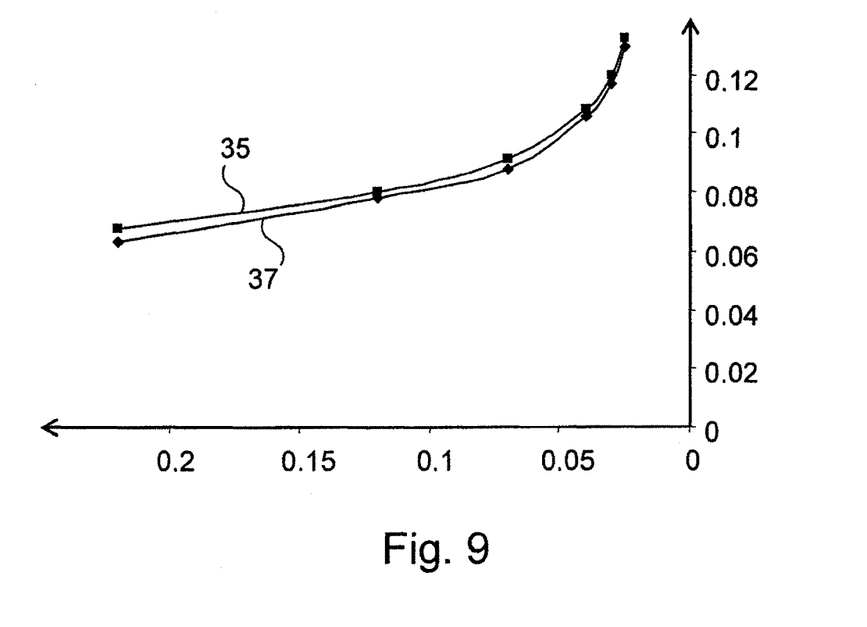
FIG. 9 is a similar graph to the lower part of FIG. 7 but with a rescaled y-axis, and with the addition of the curve of the practical threshold before pitting appears.

Thus, as may be better seen in FIG. 9, which reproduces the part of the curve 35 seen at the bottom of FIG. 7 with a rescaled y-axis, for a material removal depth of 0.22 mm, the pitting appearance threshold is about 0.069 mm/revolution, whereas, for a material removal depth of 0.07 mm, the pitting appearance threshold is about 0.091 mm/revolution.

Thus, the threshold for 0.07 mm is 32% higher than the threshold for 0.22 mm.

The curve 37 in FIG. 9 gives the practical threshold before appearance of pitting, i.e. the curve giving the maximum finishing advance setpoint values that may be used in practice.

Generally, for finishing advance values on or above the curve 35, pitting is certain; for finishing advance values on or below the curve 37, pitting will certainly not appear; and for finishing advance values between the curve 37 and the curve 35, pitting may or may not appear.

The offset between the curve 35 of the pitting appearance threshold and the curve 37 of the practical threshold before appearance of pitting depends on the precision of the machine used and on the wear margin provided for the finishing tool (this wear margin is related to the frequency with which the tool is replaced).

In the example illustrated, the machine has a good precision and the finishing tool 10, made of diamond, is changed after it has been used to machine the finishing surface of one thousand ophthalmic lenses.

The offset between the curves 35 and 37 is not constant because it also depends on the amount of pitting that appears: the greater the amount of pitting, the larger the offset.

For a material removal depth of 0.22 mm, the practical threshold before appearance of pitting is 0.063 mm/revolution, whereas, for a material removal depth of 0.07 mm, the practical threshold before appearance of pitting is 0.087 mm/revolution.

Thus, the threshold for 0.07 mm is 38% higher than the threshold for 0.22 mm.

The following values were also measured in trials on which the present invention is based:

| Material removal depth (mm) | Pitting appearance threshold (mm/revolution) | Practical threshold before appearance of pitting (mm/revolution) |
|---|---|---|
| 0.035 | 0.112 | 0.111 |
| 0.060 | 0.093 | 0.091 |
| 0.080 | 0.090 | 0.082 |
| 0.095 | 0.086 | 0.078 |

It will be noted that, up to now, the various organic materials from which ophthalmic lenses are made were considered to have a similar behavior to the material CR39 with respect to the machining of a finishing surface; therefore, up to now the pitting appearance threshold for the material MR7 has been considered to be independent of pass depth setpoint; and the conventional finishing advance setpoint of 0.063 mm/revolution has been considered to be usable whatever the finishing pass depth, which was generally fixed, in the same way as for the material CR39, to 0.20 mm.

In fact, as the discovery on which the present invention is based shows, for the material MR7, it is possible to increase very substantially the finishing advance, and therefore carry out the step of machining a finishing surface more rapidly, by reducing the pass depth.

The following constraints must be respected:
(i) the pass depth must be sufficiently large to remove defects related to the machining of a roughing surface; and
(ii) the finishing advance must not exceed the practical threshold before appearance of pitting.

Constraint (ii) is met when values given by the curve 37 are chosen.

As regards constraint (i), it is known that during the operation for machining a roughing surface, cracks 34, which propagate to a depth E under the surface 32, and more precisely under the bottoms of the trough 33, are created under the roughing surface 32.

The cracks 34 are the main defects that must be removed during the operation for machining a finishing surface. It is also necessary to rectify slight differences in shape liable to appear between the roughing target surface and the surface passing through the bottom lines of the trough 33.

Conventionally, for the material CR39, the pass depth A chosen is equal to 0.20 mm, which is considerably larger than the crack depth E.

Here, for the material MR7, the pass depth A chosen is similar to the crack depth E. In this case, the pass depth A, defined by the finishing pass depth setpoint given to the machine 30, is chosen between 0.015 mm and 0.075 mm.

Generally, for a machine of good precision, the roughing tool 31 being a rotary mill the radius of curvature R' of which is 30 mm and the roughing advance being 2.19 mm/revolution (the roughness D' is then 0.02 mm), a pass depth of 0.05 mm is a suitable value.

Under the chosen experimental conditions (roughness B' of 0.02 mm) this pass depth A of 0.05 mm corresponds to a material removal depth D of 0.07 mm.

The maximum value for the finishing advance, given by curve 37 in FIG. 9, is then 0.087 mm/revolution.

If, for a blank 16 having a diameter of 70 mm, machining, on the face 17 of the blank 16, of a toroidal surface the radii of curvature of which are 80 mm and 300 mm is taken as an example, the machining time (step of machining a roughing surface and step of machining a finishing surface) is 42.6 s when the step of machining a finishing surface uses conventional parameters of 0.20 mm for the pass depth and 0.063 mm/revolution for the finishing advance; whereas, with the aforementioned parameters (pass depth of 0.05 mm and finishing advance of 0.087 mm/revolution), the total machining time drops to 35.2 s, i.e. decreases by 17% (in both cases the same parameters are kept for the step of machining a roughing surface, the roughing advance in particular being set to 2.19 mm/revolution).

To further minimize the time taken to carry out the operation for machining a finishing surface, it is also possible to decrease the roughing roughness B' by changing the roughing advance value, i.e. the pitch C' of the roughing trough 33.

As the formula given above showed, the roughing roughness B' varies as the square of the roughing advance or pitch C'.

Decreasing the time taken to carry out the step of machining a finishing surface by decreasing the roughing roughness B' therefore causes the time taken to carry out the step of machining a roughing surface to increase since the roughing advance is decreased.

A method that allows the roughing advance for which the total machining time (step of machining a roughing surface and step of machining a finishing surface) is minimized to be obtained will now be described.

Figure 10:
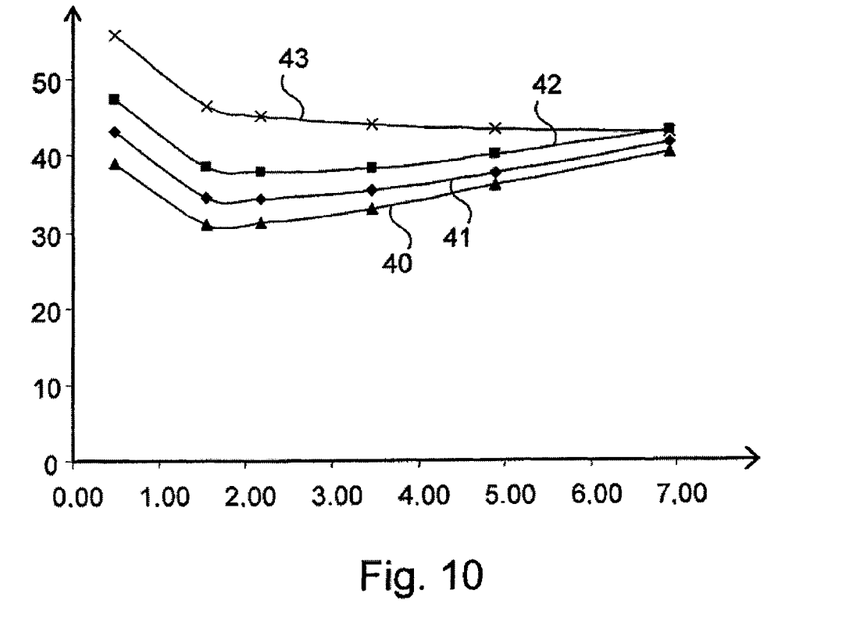
FIG. 10 is a graph in which the x-axis represents the roughing advance setpoint and the y-axis represents the total time taken to carry out the step of machining a roughing surface and the step of machining a finishing surface, the top curve being established for unchanged steps of machining a finishing surface, the other curves being established for steps of machining a finishing surface according to the invention, for various finishing pass depth values.

Total time is modeled by the following relationship:

$$T = K1 + \frac{K2}{C'} + \frac{K3}{C}$$

where:

K1 is a constant grouping together the time spent by the machine 30 on operations other than the step of machining a finishing surface and the step of machining a finishing surface;

K2 is a constant related to the step of machining a roughing surface; and

K3 is a constant related to the step of machining a finishing surface.

It will be noted that the constant K3 depends on the geometry of the surface to be machined: it will increase in proportion to the complexity of the surface.

It will also be noted that the constants K2 and K3 depend on the diameter of the blank 16.

To determine the constants K1, K2 and K3, mock runs are carried out on the machine 30, giving, to the machine 30, for each run, the same diameter for the blank 16 and the same surface geometry to be produced.

For example, mock timing runs were carried out for the following trials:

standard roughing advance and standard finishing advance;

roughing advance multiplied by 2 and standard finishing advance; and standard roughing advance and finishing advance multiplied by 2.

By solving a simple linear system of three equations (one per trial) containing three unknowns (the constants K1, K2 and K3), the constants K1, K2 and K3 may be determined.

Then, using one and the same pass depth A, the total machining time T is calculated for a certain number of roughing advance values, the pass depth A being chosen, as explained above, to be as similar as possible to the crack depth E.

In the graph in FIG. 10, the x-axis represents the roughing advance and the y-axis the total time T.

The curves 40, 41 and 42 were established for a finishing pass depth A of 0.02 mm, 0.05 mm and 0.10 mm, respectively.

The roughing advance values employed were, for example, as shown in FIG. 10: 0.5 mm/revolution, 1.5 mm/revolution, 2.2 mm/revolution, 3.5 mm/revolution, 4.9 mm/revolution and 6.9 mm/revolution.

For each roughing advance value employed, the roughing roughness B' was determined from the radius of curvature R' and the relationship given above.

The sum of the roughing roughness B' and the pass depth A gives the material removal depth D.

From the material removal depth D, the finishing advance is determined using the curve 37 in FIG. 9.

The finishing advance being determined in this way, the total machining time T is calculated with the above relationship.

It may be seen in FIG. 10 that for the curve 40 (finishing pass depth A of 0.02 mm) the shortest total machining time T is obtained for the roughing advance value of 1.5 mm/revolution; and that, for the curves 41 and 42 (finishing pass depth A of 0.05 mm and 0.10 mm, respectively) the shortest total time T is obtained for the roughing advance value of 2.2 mm/revolution.

A first approach consists in selecting the roughing advance value for which the total time T is the shortest (1.55 mm/revolution for the curve 40 and 2.2 mm/revolution for the curves 41 and 42) and employing the corresponding finishing advance value.

Another approach consists in continuing with the calculations, new values similar to the value for which the total time T is shortest being employed, in order to refine the calculation of the optimal roughing advance value.

Here, for the curve 41 (finishing pass depth A of 0.05 mm) the total machining time T is minimized for the roughing advance value of 1.90 mm/revolution.

The corresponding finishing advance value is then 0.090 mm/revolution.

Returning to the example of a 70 mm-diameter blank 16, the surfacing of the face 17 to obtain a toroidal surface the radii of curvature of which are 80 mm and 300 mm (the total machining time for this surfacing operation with conventional parameters is, as was seen above, 42.6 s (roughing advance value of 2.19 mm/revolution, finishing pass depth A of 0.20 mm and finishing advance of 0.063 mm/revolution), whereas the total machining time with action on only the step of machining a finishing surface is 35.2 s (roughing advance of 2.19 mm/revolution, finishing pass depth A of 0.05 mm and finishing advance of 0.087 mm/revolution)) requires, with the optimized values (roughing advance of 1.90 mm/revolution and finishing advance of 0.090 mm/revolution), a total machining time T of 34.8 s.

For the sake of comparison, the curve 43 in FIG. 10 gives the total machining time for the aforementioned finishing pass depth and finishing advance (0.05 mm and 0.087 mm/revolution, respectively). It may be seen that in this case the total time decreases continuously with roughing advance, without passing through a minimum, and that it is always higher than the total time T for the same finishing pass depth (curve 41).

It will be noted that other trials were carried out with a roughing tool 31 configured to form a roughing trough having a slightly larger radius of curvature, namely 33.5 mm instead of 30 mm; and that the shortest total time T was then obtained for a roughing advance value of 1.94 mm/revolution, with the total machining time T then being 34.1 s.

Generally, for a roughing tool configured to form a roughing trough having a radius of curvature R' comprised between 33 and 34 mm, it is advantageous to use roughing advance setpoints comprised between 1.16 and 5.18 mm/revolution.

Figure 11:
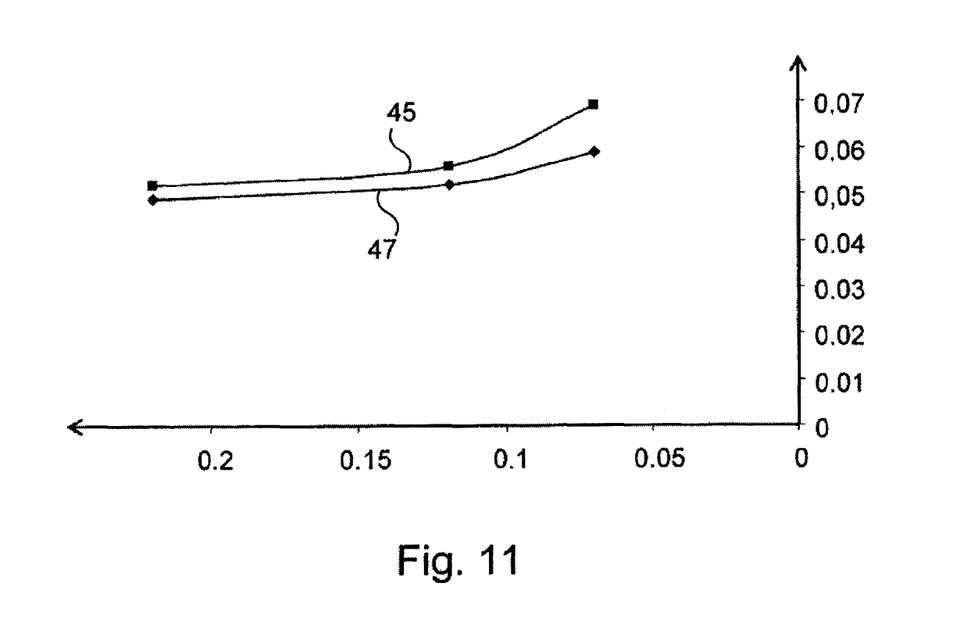
FIG. 11 is a similar graph to that in FIG. 9, but for the material MR8.

FIG. 11 is a similar graph to that in FIG. 9, but for the material MR8.

The curve 45 shows the pitting appearance threshold, whereas the curve 47 shows the practical threshold before pitting appears.

For a material removal depth of 0.22 mm, the pitting appearance threshold is 0.052 mm/revolution and the practical threshold before appearance of pitting is 0.049 mm/revolution, whereas, for a material removal depth of 0.07 mm, the pitting appearance threshold is 0.069 mm/revolution and the practical threshold before appearance of pitting is 0.059 mm/revolution.

Thus, the pitting appearance threshold for 0.07 mm is 33% higher than the threshold for 0.22 mm.

The practical threshold before the appearance of pitting for 0.07 mm is 20% higher than the practical threshold before appearance of pitting for 0.22 mm.

The following values were also measured in trials on which the present invention is based:

| Material removal depth (mm) | Pitting appearance threshold (mm/revolution) | Practical threshold before appearance of pitting (mm/revolution) |
|---|---|---|
| 0.035 | 0.083 | 0.066 |
| 0.060 | 0.072 | 0.060 |
| 0.080 | 0.065 | 0.057 |
| 0.095 | 0.061 | 0.055 |

In the examples described, the material from which the blank 16 is made is MR7 or MR8, for which the pitting appearance threshold has been observed to substantially increase when the material removal depth is decreased. As a variant, the material is neither MR7 or MR8, instead being, for example, another polythiourethane or another organic or inorganic material.

The experimental conditions under which the pitting appearance threshold curves were established involved machining a planar target roughing surface, and a step of machining a planar target finishing surface parallel to the target roughing surface. As a variant, the target surfaces are not planar, for example being parallel spheres.

In the examples described above, the finishing tool 10 has a radius of curvature of 2 mm. As a variant, this radius of curvature may be different, for example 5, 7 or 12 mm.

It will be noted that with a larger radius of curvature, the pitting appearance threshold curve is shifted upward, i.e. for a given pass depth, the pitting appearance threshold is higher. Therefore, by increasing the radius of curvature of the finishing tool it is possible to increase the finishing advance and therefore to decrease the time taken to implement the step of machining a finishing surface.

For example, for the material MR7, if a finishing tool having a radius of curvature of 5 mm is used, the following values are obtained:

| Material removal depth (mm) | Pitting appearance threshold (mm/revolution) | Practical threshold before appearance of pitting (mm/revolution) |
|---|---|---|
| 0.035 | 0.177 | 0.176 |
| 0.060 | 0.152 | 0.148 |
| 0.080 | 0.142 | 0.134 |
| 0.095 | 0.137 | 0.131 |

For the material MR7, if a finishing tool having a radius of curvature of 7 mm is used, the following values are obtained:

| Material removal depth (mm) | Pitting appearance threshold (mm/revolution) | Practical threshold before appearance of pitting (mm/revolution) |
|---|---|---|
| 0.035 | 0.210 | 0.208 |
| 0.060 | 0.180 | 0.175 |
| 0.080 | 0.168 | 0.158 |
| 0.095 | 0.162 | 0.155 |

For the material MR8, if a finishing tool having a radius of curvature of 5 mm is used, the following values are obtained:

| Material removal depth (mm) | Pitting appearance threshold (mm/revolution) | Practical threshold before appearance of pitting (mm/revolution) |
|---|---|---|
| 0.035 | 0.126 | 0.103 |
| 0.060 | 0.113 | 0.095 |
| 0.080 | 0.103 | 0.089 |
| 0.095 | 0.097 | 0.087 |

For the material MR8, if a finishing tool having a radius of curvature of 7 mm is used, the following values are obtained:

| Material removal depth (mm) | Pitting appearance threshold (mm/revolution) | Practical threshold before appearance of pitting (mm/revolution) |
|---|---|---|
| 0.035 | 0.149 | 0.122 |
| 0.060 | 0.133 | 0.113 |
| 0.080 | 0.122 | 0.105 |
| 0.095 | 0.115 | 0.103 |

In the examples described above, the cutting angle is zero. As a variant, the cutting angle may be different, in particular negative.

It will be noted that with a negative cutting angle the pitting appearance threshold values are higher.

In the examples described above, the cutting edge 14 (FIG. 2) of the finishing tool is a standard cutting edge. As a variant, a cutting edge with an inclined facet, such as described in international patent application WO 2006/097607, may be used. With such an inclined facet a higher pitting appearance threshold is obtained.

Generally, in the trials on which the present invention is based, values of the practical threshold before appearance of pitting were observed to be between 85 and 99% of the values of the pitting appearance threshold.

In practice, advantageous values for the pass depth setpoint A are comprised between 0.015 mm and 0.075 mm (material removal depth D comprised between 0.035 mm and 0.095 mm if the roughing roughness B' is 0.02 mm); and more specifically, the finishing pass depth setpoints are comprised between 0.03 and 0.06 mm.

With the latter range of finishing pass depth setpoints A, suitable finishing advances lie in the following ranges:
  0.076 to 0.102 mm/revolution for the material MR7 and a radius of curvature R comprised between 1.9 and 2.1 mm;
  0.121 to 0.160 mm/revolution for the material MR7 and a radius of curvature R comprised between 4.9 and 5.1 mm;
  0.055 to 0.074 mm/revolution for the material MR8 and a radius of curvature R comprised between 1.9 and 2.1 mm; and
  0.088 to 0.117 mm/revolution for the material MR8 and a radius of curvature R comprised between 4.9 and 5.1 mm.

Generally, the trials on which the present invention is based showed that advantageous materials for decreasing the length of the surfacing step are materials for which, in the step of machining a finishing surface, the pitting appearance threshold for a material removal depth of 0.07 mm is at least 15% higher than the pitting appearance threshold, in a step of machining a finishing surface, for a material removal depth of 0.22 mm. Theoretically, this ratio of at least 15% is capable of reaching 200%.

In the examples described above, the roughing trough and the finishing trough are spirals. As a variant, the troughs are parallel straight lines spaced apart from each other by a pitch defined by the roughing advance or finishing advance setpoint given to the machine.

Many other variants are possible, depending on the circumstances, and it will be recalled, in this respect, that the invention is not limited to the examples described and shown.

The invention claimed is:

1. A process for obtaining an ophthalmic lens, comprising:
  a step of providing a blank (16) made of a material able to be surfaced by machining; and
  a step of surfacing the face (17) of said blank (16) by machining, comprising, in succession, a step of machining a roughing surface (32), and a step of machining a finishing surface (20), said step of machining a roughing surface (32) being carried out with a machine (30) comprising a roughing tool (31) forming a roughing surface (32) comprising a roughing trough (33) having a circularly arcuate profile the radius of curvature (R') of which is fixed by the shape of the roughing tool (31) and having a pitch (C') defined by a roughing advance setpoint given to said machine; said step of machining a finishing surface (20) being carried out with a machine (30) comprising a finishing tool (10) that forms a finishing surface (20) by digging said roughing surface (32) to a depth defined by a finishing pass depth setpoint (A) given to said machine, thereby forming a finishing trough (18) having a pitch (C) defined by a finishing advance setpoint given to said machine;
  characterized in that:
  said step of providing a blank (16) comprises the step of selecting, for said blank (16), a said material that has a pitting appearance threshold during a said step of machining a finishing surface over a material removal depth (D) of 0.07 mm that is at least 15% higher than the pitting appearance threshold during a said step of machining a finishing surface over a material removal depth (D) of 0.22 mm, each said pitting appearance threshold being the finishing advance setpoint from which pitting appears for a preset material removal depth (D), each said material removal depth (D) being the sum of the finishing pass depth setpoint (A) employed and the roughing roughness B' given by the relationship:

$$B' = \frac{C'^2}{8R'}$$

where:
  C' is the roughing advance or the pitch of the roughing trough; and
  R' is the radius of curvature of the roughing tool or the roughing trough;
  said step of machining a finishing surface (20) comprises the step of selecting said finishing pass depth setpoint (A) between 0.015 mm and 0.075 mm; and
  said step of machining a finishing surface (20) comprises the step of selecting said finishing advance setpoint between 85 and 99% of the pitting appearance threshold for the material removal depth (D) given by the sum of the selected finishing pass depth setpoint (A) and the roughing roughness B'.

2. The process as claimed in claim 1, characterized in that said step of providing a blank (16) comprises the step of selecting, for said blank (16), a polythiourethane.

3. The process as claimed in claim 2, characterized in that said polythiourethane is MR7.

4. The process as claimed in claim 3, characterized in that said step of machining a finishing surface is carried out with a finishing tool (10) configured to form a finishing trough (18) having a radius of curvature (R) comprised between 1.9 and 2.1 mm; said finishing pass depth setpoint (A) is comprised between 0.03 and 0.06 mm; whereas said finishing advance setpoint is comprised between 0.076 and 0.102 mm/revolution.

5. The process as claimed in claim 3, characterized in that said step of machining a finishing surface is carried out with a finishing tool (10) configured to form a finishing trough (18) having a radius of curvature (R) comprised between 4.9 and 5.1 mm; said finishing pass depth setpoint (A) is comprised between 0.03 and 0.06 mm; whereas said finishing advance setpoint is comprised between 0.121 and 0.160 mm/revolution.

6. The process as claimed in claim 2, characterized in that said polythiourethane is MR8.

7. The process as claimed in claim 6, characterized in that said step of machining a finishing surface is carried out with a finishing tool (10) configured to form a finishing trough (18) having a radius of curvature (R) comprised between 1.9 and 2.1 mm; said finishing pass depth setpoint (A) is comprised between 0.03 and 0.06 mm; whereas said finishing advance setpoint is comprised between 0.055 and 0.074 mm/revolution.

8. The process as claimed in claim 6, characterized in that said step of machining a finishing surface is carried out with a finishing tool (10) configured to form a finishing trough (18) having a radius of curvature (R) comprised between 4.9 and 5.1 mm; said finishing pass depth setpoint (A) is comprised between 0.03 and 0.06 mm; whereas said finishing advance setpoint is comprised between 0.088 and 0.117 mm/revolution.

9. The process as claimed in claim 1, characterized in that said step of machining a roughing surface (32) and said step of machining a finishing surface (20) are carried out with one and the same machine (30), and said step of machining a roughing surface (32) comprises the step of selecting, for said roughing advance setpoint, a value minimizing a total time T taken, by said machine (30), to implement the step of machining a roughing surface (32) and the step of machining a finishing surface (20).

10. The process as claimed in claim 9, characterized in that said step of selecting, for said roughing advance setpoint, a value minimizing a total time T, comprises:

the step of modeling the total time T by the relationship:

$$T = K1 + \frac{K2}{C'} + \frac{K3}{C}$$

where:
- K1 is a constant grouping together the time spent by the machine (30) on operations other than the step of machining a finishing surface (32) and the step of machining a finishing surface (20);
- K2 is a constant related to the step of machining a roughing surface (32);
- K3 is a constant related to the step of machining a finishing surface; and
- C is the roughing advance or the pitch of the finishing trough;

the step of calculating, for each of n roughing advance setpoint values, the respective total machining time T, with, for each ith roughing advance setpoint, for i taken from among 1 to n, the ith finishing advance setpoint calculated by implementing said step of selecting the finishing advance setpoint, taking into account the material removal depth (D) given by the sum of the selected finishing pass depth setpoint (A) and the roughing roughness B', corresponding to the ith roughing advance setpoint; and the step of selecting, as roughing advance setpoint, the mth roughing advance setpoint, and, as finishing advance setpoint, the mth finishing advance setpoint, where m is the i for which the total time T is the shortest.

11. The process as claimed in claim 1, characterized in that said step of machining a roughing surface is carried out with a roughing tool (31) configured to form a roughing trough (33) having a radius of curvature (R') comprised between 33 and 34 mm; whereas said roughing advance setpoint is comprised between 1.16 and 5.18 mm/revolution.

12. The process as claimed in claim 1, characterized in that said roughing trough (33) and said finishing trough (18) are spirals.

* * * * *